United States Patent [19]

Ohnuma et al.

[11] 4,308,551
[45] Dec. 29, 1981

[54] COLOR TELEVISION CAMERA WITH TEST PATTERN

[75] Inventors: Takashi Ohnuma; Shiomi Kanie; Toshio Araki, all of Yokohama, Japan

[73] Assignee: Canon Kabushiki Kaisha, Tokyo, Japan

[21] Appl. No.: 131,491

[22] Filed: Mar. 18, 1980

[30] Foreign Application Priority Data

Mar. 19, 1979 [JP] Japan .................................. 54-32094

[51] Int. Cl.³ ............................................. H04N 9/04
[52] U.S. Cl. ....................................... 358/10; 358/29; 358/41; 358/55
[58] Field of Search ....................... 358/10, 29, 55, 41

[56] References Cited

U.S. PATENT DOCUMENTS

3,552,288  1/1971  Corley .................................. 358/10

FOREIGN PATENT DOCUMENTS

2813262  10/1978  Fed. Rep. of Germany ........ 358/10

Primary Examiner—Robert L. Richardson
Attorney, Agent, or Firm—Fitzpatrick, Cella, Harper & Scinto

[57] ABSTRACT

This specification discloses a color television camera having a test pattern projecting device. This test pattern projecting device projects a test pattern image of a desired color temperature onto an image pickup device. The color temperature of the test pattern image is adjustable.

2 Claims, 1 Drawing Figure

COLOR TELEVISION CAMERA WITH TEST PATTERN

BACKGROUND OF THE INVENTION

1. Field of the Invention

This invention relates to a color television camera, and more particularly to a television camera having a test pattern projector.

2. Description of the Prior Art

In color television cameras, red, green and blue monochromatic images are usually formed on three image pickup tubes and electrical signals corresponding to these monochromatic images are taken out. Thereafter, the electrical signals are subjected to an electrical processing and color signals are obtained through an encoder. With these color television cameras, the situation that the intensity of illumination of an object becomes insufficient usually does not occur under the sun light and therefore, they are designed so that the maximum sensitivity is obtained with an illumination having a color temperature of about 3000° K. as the standard so as to enable the cameras to be most effectively used under an artificial illuminating source.

Where an object is illuminated by other illuminating light than 3000° K. as in the outdoor environment, the camera is adjusted by a color temperature changing filter or painting as if the object were illuminated by an illuminating light of 3000° K.

Therefore, even if the illuminating light source of the pattern projector is at 3000° K., such light actually cannot be said to be an illuminating light of 3000° K. due to this color temperature changing filter. Accordingly, where the color temperature changing filter is used or painting is effected, the color temperature of the illuminating light source of the pattern projector must be changed to the color temperature of the illuminating light of the object.

The chart illuminating system of the conventional television lens has been provided by a single lamp, but the characteristic of a tungsten lamp is such that if the lamp voltage is varied, not only the quantity of light but also the color temperature is varied at the same time and so, in order to obtain a desired characteristic of the television camera, it is necessary to adjust it by the use of an ND filter or a color temperature filter. However, the ND filter and the color temperature filter are not continuous and the resolving optical system and image pickup tubes of the television camera have irregularity and this leads to an excessive adjustment time required to obtain the required characteristic of the camera. Further, now that it has become possible to adjust the camera by the use of a computer, it becomes necessary, for example, to vary only the quantity of light without varying the color temperature for the chart and illuminating system of the lens or to provide an illuminating light source having the same color temperature as that of the color temperature filter of the television camera.

SUMMARY OF THE INVENTION

In view of the above-noted points, the present invention intends to provide a television lens in which the color temperature and the quantity of light can be preset arbitrarily and they can be controlled by a camera or an internal change-over signal.

The invention will become fully apparent from the following detailed description thereof taken in conjunction with the accompanying drawing.

DESCRIPTION OF THE PREFERRED EMBODIMENT

Figure 1:
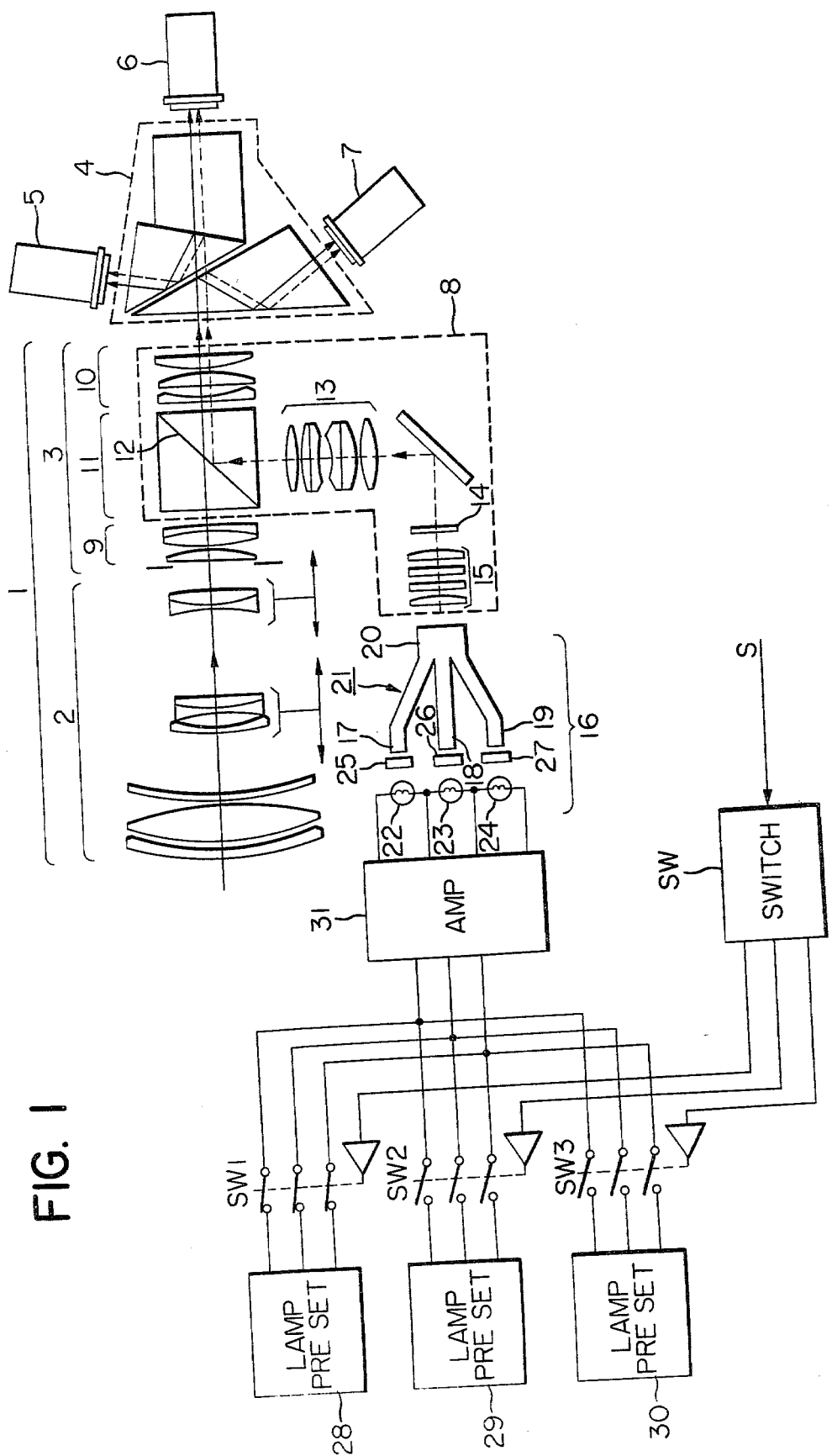
FIG. 1 is a block diagram of the television camera of the present invention.

Designated by 1 in the drawing is a zoom lens. This lens 1 comprises a zoom 2 and a fixed portion 3. Designated by 4 is a three-color resolving prism. The light from the zoom lens 1 is resolved into three colors, i.e. red, green and blue by the color resolving prism 4. Designated by 5, 6 and 7 are image pickup tubes on the surface of which are formed red, green and blue images of an object. Denoted by 8 is a test pattern projecting optical system. This pattern projecting optical system 8 is inserted in a clearance portion 11 between lenses 9 and 10 forming the fixed portion 3 of the zoom lens. The projecting optical system 8 includes a 45° mirror 12, a projection lens 13 and a test pattern chart 14. When this projecting optical system is inserted in the zoom lens, the light from the object is intercepted by the 45° mirror 12. Denoted by 15 is a condenser lens. Designated by 16 is a variable color temperature illuminating light source.

Since the pattern projector system is constructed as described above, the image of the pattern chart 14 illuminated by the illuminating light source 16 is formed on the image pickup tubes 5, 6 and 7. The sensitivity balance of the image pickup tubes is adjusted in accordance with the pattern image. At this time, the color temperature of the light illuminating the test pattern chart 14 must correspond to the color temperature of the light from the object. Accordingly, this illuminating system 16 must render the color temperature changeable.

This variable color temperature illuminating system 16 comprises a red light source, a green light source and a blue light source comprising a fiber bundle 21 having three incidence surfaces 17, 18, 19 and an emergence surface 20, tungsten lamps 22, 23, 24 and a red transmitting filter 25, a green transmitting filter 26 and a blue transmitting filter 27.

The color temperature is changed by changing the balance of quantity of light of these red, green and blue light sources. The variable color temperature illuminating system 16 is described in our prior U.S. application Ser. No. 888,780, now U.S. Pat. No. 4,237,475.

The television camera of the present invention greatly differs from said prior application in the method of adjusting the brightness of the lamps 22, 23 and 24 of the variable color temperature illuminating system.

That is, in the method disclosed in said prior application, the adjustment of the brightness of the lamps 22, 23 and 24 is effected in an analog fashion, whereas in the device of the present invention a switching circuit is utilized and the adjustment of the brightness of the lamps is effected in a digital fashion by connecting the lamps 22, 23 and 24 to power sources of different voltages.

Designated by 28, 29 and 30 are preset portions for setting the lamp voltages of the lamps 22, 23 and 24. A lamp voltage for obtaining any desired color temperature and quantity of light is set in each of these preset portions 28, 29 and 30 and that lamp voltage is selected by receiving a control signal S from an internal change-over switch or from the camera and by using the signal change-over means of relay or analog switch circuits SW, SW1, SW2, and the selected lamp voltage is passed through a power amplifying circuit 31 to turn on the lamps. Accordingly, by switching operation, a light source of any desired color temperature may be obtained.

What we claim is:

1. A television camera having a test pattern projector, comprising:

an objective lens;

a color resolving optical system disposed on the optic axis of said objective lens;

an image pickup device for photographing a monochromatic image formed by said objective lens and said color resolving optical system;

a test pattern chart projecting device including a test pattern chart for forming a monochromatic test pattern image on said image pickup device; and a variable color temperature illuminating device for illuminating said test pattern chart, said illuminating device comprising at least two light sources having different wavelength widths, a plurality of circuits having different set values for setting the quantity of light of said light sources, and a switching circuit for selectively applying the signal from said setting circuit to said light sources.

2. The television camera according to claim 1, wherein a power amplifying circuit is provided between said setting circuit for setting the quantity of light of said light sources and said light sources.

* * * * *